United States Patent
Kothuri

(10) Patent No.: US 7,181,467 B2
(45) Date of Patent: Feb. 20, 2007

(54) DELAYED DISTANCE COMPUTATIONS FOR NEAREST-NEIGHBOR QUERIES IN AN R-TREE INDEX

(75) Inventor: Ravi Kanth V. Kothuri, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 379 days.

(21) Appl. No.: 10/397,529

(22) Filed: Mar. 27, 2003

(65) Prior Publication Data

US 2004/0193615 A1    Sep. 30, 2004

(51) Int. Cl.
*G06F 17/00* (2006.01)
*G06F 17/30* (2006.01)

(52) U.S. Cl. .................................. 707/104.1; 707/3
(58) Field of Classification Search ............... 707/1–7, 707/100, 104.1, 101, 102
See application file for complete search history.

(56) References Cited

U.S. PATENT DOCUMENTS

| | | | |
|---|---|---|---|
| 5,953,722 A * | 9/1999 | Lampert et al. | 707/100 |
| 5,963,956 A * | 10/1999 | Smartt | 707/104.1 |
| 6,263,334 B1 * | 7/2001 | Fayyad et al. | 707/5 |
| 6,353,832 B1 * | 3/2002 | Acharya et al. | 707/104.1 |
| 6,438,269 B1 * | 8/2002 | Kim et al. | 382/261 |
| 6,446,060 B1 * | 9/2002 | Bergman et al. | 707/3 |
| 6,778,981 B2 * | 8/2004 | Lee et al. | 707/3 |

\* cited by examiner

*Primary Examiner*—Uyen Le
(74) *Attorney, Agent, or Firm*—Bingham McCutchen LLP

(57) ABSTRACT

A method for locating neighboring data geometries of a query geometry. A minimum bounding rectangle of the query geometry is determined. A minimum bounding rectangle of each data geometry is determined. Candidate data geometries are identified by determining if a distance between the minimum bounding rectangle of the query geometry and the data geometry is less than a threshold distance. A distance between the query geometry and the candidate data geometry is mathematically calculated when a number of candidate data geometries equals a threshold number or when no more data geometries remain.

19 Claims, 5 Drawing Sheets

DELAYED DISTANCE COMPUTATIONS FOR NEAREST-NEIGHBOR QUERIES IN AN R-TREE INDEX

FIELD OF THE INVENTION

The present invention relates to a method for determining relationships among one or more query objects and one or more objects represented in a database.

BACKGROUND OF THE INVENTION

Information in databases may be organized according to any number of techniques. Examples of the many database indexes include the quadtree, the B-tree, and the R-tree. Different database index structures may be more suitable for particular types of data. For example, some database index structures, such as B+trees, may not be suited multi-dimensional data.

The R-tree is an object hierarchy that is applicable to arbitrary spatial objects that is formed by aggregating minimum bounding boxes for the spatial objects and storing the aggregates in a tree structure. The aggregation is based, in part, on proximity of the objects or bounding boxes. Each node in the tree represents a region in the space. Its children represent (possibly overlapping) subregions. The child regions do not need to cover the entire parent region. While the R-tree is designed primarily for storing region objects, it can be adapted to points by defining points as "degenerate" rectangles where all vertices are identical.

The number of objects or bounding boxes that are aggregated in each node is permitted to range between $m \leq (M/2)$ and M, thereby leading to use of the prefix (m,M) to characterize a particular R-tree and mirroring the effect of a B-tree. The root node in an R-tree has at least two entries unless it is a leaf node, in which case it has just one entry corresponding to the bounding box of an object. The tree is height-balanced (with maximum height $\log_m r$).

An R-tree can be constructed in either a dynamic or a static manner. Dynamic methods build the R-tree as the objects are encountered, while static methods wait until all the objects have been input before building the tree. The results of the static methods are usually characterized as being packed since knowing all of the data in advance permits each R-tree node to be filled to its capacity.

There are two principal methods of determining how to fill each R-tree node. The most natural method is to take the space occupied by the objects into account when deciding which ones to aggregate. An alternative is to order the objects prior to performing the aggregation. However, in this case, once an order has been established, there is not really a choice as to which objects (or bounding boxes) are being aggregated. One order preserves the order in which the objects were initially encountered. That is, the objects in aggregate i have been encountered before those in aggregate i+1.

According to one method, insertion of a region object R occurs as follows. Starting at root, children that completely contain R are identified. If no child completely contains R, one of the children is chosen and expanded so that it does contain R. If several children contain R, one is chosen and the process proceeds to the next child.

The above containment search is repeated with children of the current node. Once a leaf node is reached, R is inserted if there is room. If no room exists in the leaf, it is replaced by two leaves. Existing objects are partitioned between two leaves and parent. If no room exists in the parent, change propagates upward.

One difference between static and dynamic methods is that static methods rebuild the entire R-tree as each new object is added. In contrast, dynamic methods add the new objects to the existing R-tree. Dynamic methods differ in the techniques used to split an overflowing node during insertion.

There are two types of dynamic methods. The first type has the goal of minimizing coverage and overlap. These goals are at times contradictory and thus heuristics are often used. The second type makes use of the ordering applied to the objects (actually their bounding boxes). They are termed nonpacked. In this case, the result is equivalent to a B+-tree and all update algorithms are B+-tree algorithms. These update algorithms do not make use of the spatial extent of the bounding boxes to determine how to split a node. Thus, the goals of minimizing overlap or coverage are not part of the node splitting process although this does not preclude these methods from having good behavior with respect to these goals.

Static methods differ on the basis of the method used to order the objects. The dynamic methods that are not based on an ordering, that is, reduction of coverage and overlap, range from being quite simple, for example, exhaustive search, to being fairly complicated, for example, R*-tree. Some method just split the overflowing node, while others, that is, the R*-tree, try to reinsert some of the objects and nodes from the overflowing nodes thereby striving for better overall behavior (e.g., reduction in coverage and overlap).

In general, the goal of splitting techniques is to minimize coverage and overlap. These goals are at times contradictory and, thus, heuristics are often used. Below are listed a few node splitting algorithms that range from being quite simple, for example, exhaustive search, to being fairly complicated, for example, R*-tree. Some methods split the overflowing node, while others try to reinsert some of the objects and nodes from the overflowing nodes, thereby striving for better overall behavior, for example, reduction in coverage and overlap.

A number of different node splitting algorithms may be tried, including:

I. Dynamic methods based on minimizing coverage and/or overlap
  1. Exhaustive search
  2. Quadratic method
  3. Linear method
  4. R*-tree
  5. Ang/Tan method II. Dynamic methods based on an ordering (nonpacked)
  1. Hilbert nonpacked
  2. Morton nonpacked III. Static methods based on an ordering
  1. Packed
  2. Hilbert packed
  3. Morton packed
  4. VAM split R-tree
  5. Top-down-greedy split (TGS) R-tree Methods I and II are useful for insertion, while method III is typically used for "bulk" creation, that is, creation of indices on a given set of objects.

SUMMARY OF THE INVENTION

The present invention provides a method for locating neighboring data geometries of a query geometry. The method includes determining a minimum bounding rectangle of the query geometry. A minimum bounding rectangle of each data geometry is determined. Candidate data geometries are identified by determining if a distance between the minimum bounding rectangle of the query geometry and the data geometry is less than a threshold distance. A distance between the query geometry and the candidate data geometry is mathematically calculated when a number of candidate data geometries equals a threshold number or when no more data geometries remain.

The present invention also includes a computer program product for performing a process of determining relationships among objects represented in a database. The computer program product according to the present invention includes a computer readable medium. Computer program instructions executable by a processor are recorded on the computer readable medium. The computer program instructions are for performing the steps of determining a minimum bounding rectangle of the query geometry, determining a minimum bounding rectangle of each data geometry, identifying candidate data geometries by determining whether data geometries fulfill a first filter condition with respect to the query geometry by comparing the minimum bounding rectangles of each data geometry with the minimum bounding rectangle of the query geometry, and continuing the comparing of the minimum bounding rectangles until a number of data geometries that fulfill the first filter condition reaches a threshold value or no more data geometries remain.

Furthermore, the present invention provides a system for performing a process of determining relationships among objects represented in a database. The system according to the present invention includes a processor operable to execute computer program instructions and a memory operable to store computer program instructions executable by the processor. The computer program instructions are for performing the steps of determining a minimum bounding rectangle of the query geometry, determining a minimum bounding rectangle of each data geometry, identifying candidate data geometries by determining whether data geometries fulfill a first filter condition with respect to the query geometry by comparing the minimum bounding rectangles of each data geometry with the minimum bounding rectangle of the query geometry, and continuing the comparing of the minimum bounding rectangles until a number of data geometries that fulfill the first filter condition reaches a threshold value or no more data geometries remain.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

A spatial or geographic database can include data concerning locations of features in space or on a surface. Spatial data can include geometric data that includes simple primitive elements such as lines, curves, polygons (with and without holes), and compound elements that are made up of a combination of the primitive elements. For example, a geographical database can include data concerning the location of various objects in a region. Along these lines, a geographic database can include mathematical representations of counties, cities, homes, apartment buildings, parks, businesses, subway stations, and other features. The location information could be in the form of latitude and longitude data or other data that defines position.

Once a database including this information is created it is typically desired to access and utilize the information. One way that the information in the databases is utilized involves determining the relative positions of particular location. Along these lines, a person might want to find certain types of businesses in a zip code region. At times, it may be desirable to generally determine whether objects in a database have overlapping locations and, if so, the extent of the overlap.

Analyses such as those described above of data in spatial, and/or geographic databases can present a number of problems. To determine relationships among data in a database can overtax memory and computing power, take an unacceptable period of time or cost an unacceptable amount of money. This is especially true with data in geographic databases.

For example, one problem concerning trying to determine whether objects have overlapping locations can involve actually comparing the outlines of the objects to see if any interactions exist. However, carrying out a point-by-point comparison of two geometries typically requires quite a long time, in some cases, on the order of minutes and, in extreme cases, hours.

The present invention provides a solution to problems of analyzing objects in databases. As such, the present invention provides a fast and simple method for determining whether two objects, or geometries, defined by data in a database intersect. Rather than taking minutes or hours to carry out, the present invention can take on the order of seconds or milliseconds. By reducing calculation times, the present invention can free up a processor to perform other calculations or for other uses, such as queries or scalability. The present invention also permits better service to be provided by reducing response times. This helps to ensure that the solution can be utilized with any geographic database, regardless of how large.

Figure 1:
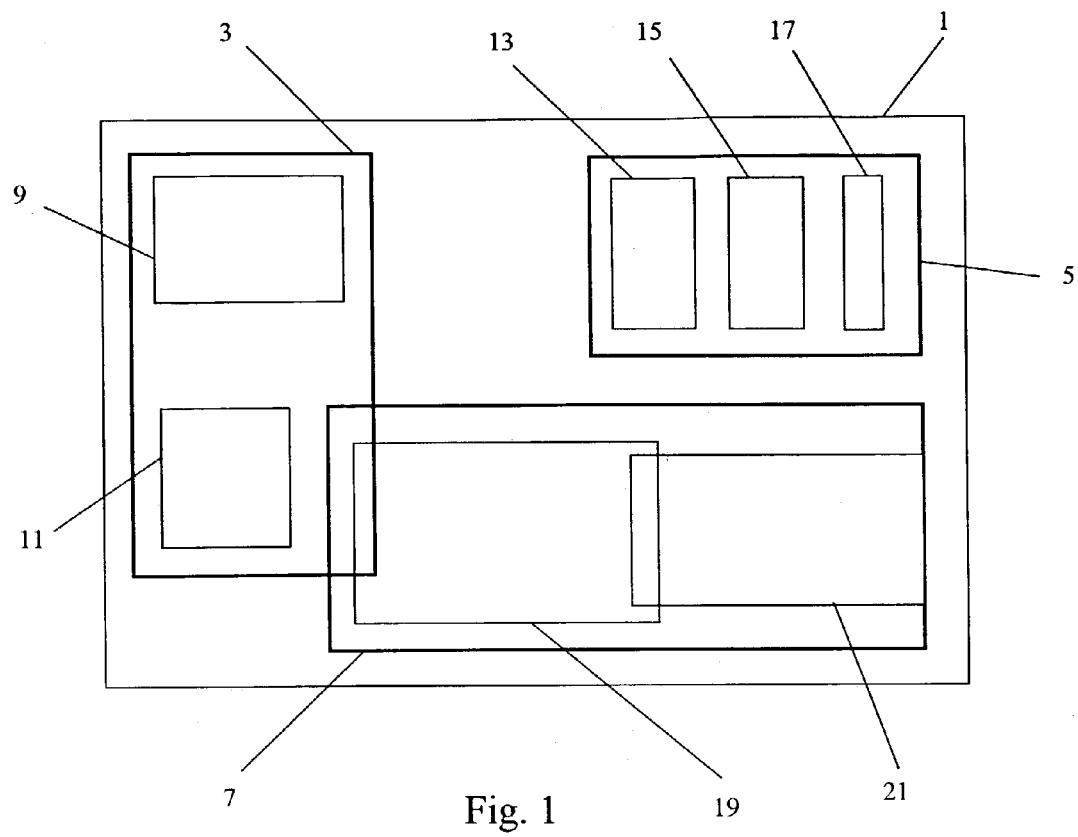
FIG. 1 represents an example of an R-tree node including two levels of children.

FIG. 1 represents a simple R-tree for illustrative purposes. The R-tree shown in FIG. 1 includes a plurality of rectangular objects. An R-tree may be utilized to index databases of objects in the form of points, lines, or rectangles. The objects may be represented by minimum bounding contours.

Additionally, the objects may be grouped in groups by minimum bounding contours.

The R-tree node shown in FIG. 1 includes two levels of children. Node 1 shown in FIG. 1 includes minimum bounding contours 3, 5, and 7, representing the first level of children. Each child node 3, 5, and 7, in turn, includes a plurality of child nodes, 9 and 11 in child 3; 13, 15, and 17 in child 5; and 19, and 21 in child 7. Each child node is defined by a minimum-bounding contour. In the example shown in FIG. 1, the minimum bounding contours are all rectangles.

Figure 2:
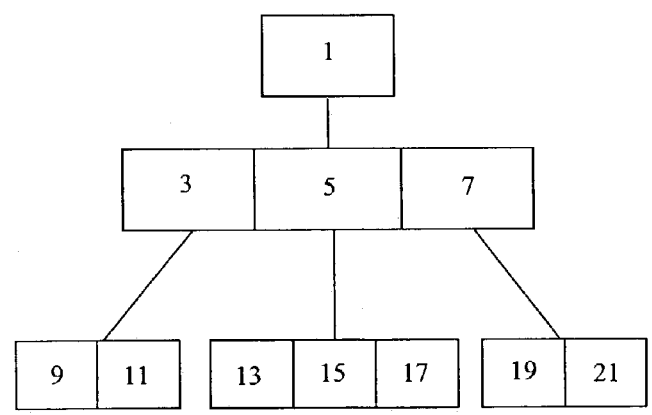
FIG. 2 represents a block diagram of an R-tree index corresponding to the example shown in FIG. 1.

FIG. 2 represents a block diagram showing an R-tree corresponding to the example illustrated in FIG. 1. For objects that are stored in respectively different leaf nodes, the more remote the nearest common ancestor node, the more different the objects are likely to be. That is, strokes or strings stored in leaf nodes having a common parent are likely to be more similar to each other than strokes or strings stored in leaf nodes only having a common grandparent.

The R-tree index may be utilized to support medium-dimensionality data, that is, data having a dimensionality in the range of 3—10. The R-tree index may be implemented utilizing an extensible indexing framework. One example of such a framework is referred to as cooperative indexing in Oracle8i, available from Oracle Corporation. This framework can allow easy creation and maintenance of domain-specific index structures on top of a server layer while reaping the full benefits of operating within a database framework. As a consequence, the R-tree index structure inherits features such as transactional semantics, integrated backup and recovery, security, and replication from the underlying database.

In the specific example of Oracle8i, the R-tree index can index two datatypes. The first datatype includes an sdo_mbr type, which is a d-dimensional rectangle specified by the lower-left and the upper-right corners. The second datatype, is an sdo_geometry type, which is an Oracle8i object type that allows for the specification of complex geometries (as defined by OGC).

Data items may be stored in a relational table, which may be referred to as the base table. The R-tree constructed for the data items may be stored in the database using a metadata table storing the information about the root of the R-tree, its dimensionality and fanout, and the name of the index table storing the nodes of the R-tree.

The R-tree index type can support three types of operations: window queries, nearest-neighbor queries, and intersection joins. Window queries specify a query window and retrieve data whose MBRs interact with the query window in one of 4 ways: intersection, containment, enclosure and exact-match. Nearest-neighbor queries specify a query point and retrieve the k closest data MBRs. Joins identify the data items of two different datasets that intersect with each other. Note that these queries are processed using the MBRs. For some applications such as GIS data where the bounding rectangles only represent first-level approximations of the data items, the query result may have to be post-processed using the complete extents of the data items to obtain the final result. In addition to indexing inherently multi-dimensional columns, R-trees can also be used to index multiple columns so as to answer queries on multiple columns efficiently.

A number of relationships can exist between and among objects represented in the R-tree. The objects may overlap to some extent, an object may lie entirely in another object or vice versa, the borders of objects may intersect, or the objects may be disjoint and have no overlap at all. Typically, a "query" geometry is provided and it is desired to identify geometries in the database, or "data geometries", that do or do not interact in some manner with the query geometry. Some times, it may be desirable to determine objects interacting in specific ways, such as all objects entirely within a query geometry. At other times, it may be desirable to identify any objects that "interact" with a particular query geometry. While objects may be compared by performing an exact comparison of the geometries that define the objects, such a comparison can take a long time and be very costly. For example, if a processor is tied up performing a comparison of geometries, then the processor is unavailable for other functions.

Examples of queries and interactions can include the following:
    window queries with different "interaction" criteria
        intersection: identify data geometries that intersect the query geometry
        inside: identify data geometries that are "completely inside" the query geometry
        coveredby: identify data geometries that "touch" on at least one border and are inside the query geometry otherwise
        contains: reverse of inside
        covers: reverse of coveredby
        touch: identify geometries that only "touch" the query geometry but disjoint otherwise
        equal: identify geometries that are exactly the same as the query geometry within-distance (or epsilon) queries: identify geometries that are within a specified distance from the query geometry nearest-neighbor queries: identify the k nearest neighbors for a query geometry.

Typically, the most frequently used window queries are the ones asking for intersection-type, inside-type, and contains-type of interactions. Within-distance queries can be thought of as intersection-type of window queries where the query geometry is enlarged by the specified distance.

Figure 3:
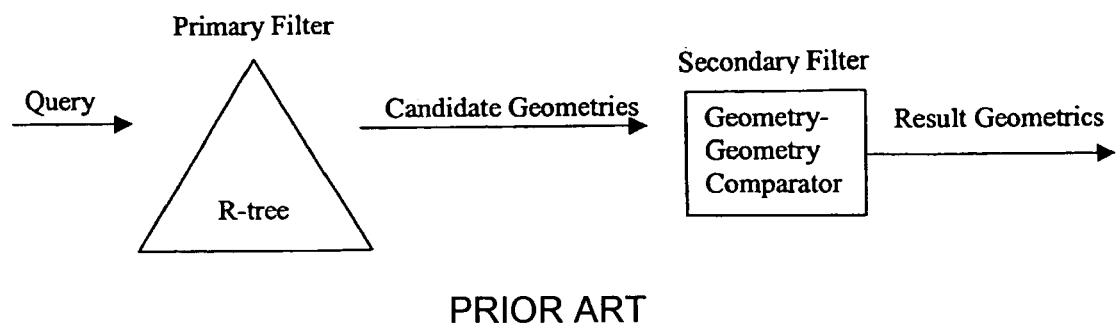
FIG. 3 represents a flowchart that illustrates query processing according to a known method.

Existing solutions to queries such as those described above may utilize a primary filter in a first stage to identify all candidate geometries that could possibly interact with a query geometry, as represented in FIG. 3. In the first stage exterior approximations for data geometries, such as minimum bounding rectangles (MBRs) and convex hulls, or quadtree tiles, which completely enclose the data geometries, may be used. This first stage, usually referred to as the primary filter, typically involves a spatial index. Candidate geometries that may satisfy a given query criterion are identified in the primary filter stage with the help of the exterior approximations in the spatial index.

In a second stage, referred to as a secondary filter, the candidate geometries identified in the first stage are compared with the query geometry and the exact result set is determined and returned to the user. A secondary filter is then employed to perform the exact mathematical comparison of all of the candidate geometries with the query geometry. Even utilizing such filters, the mathematical comparison can be quite expensive. For example, if the query geometry is large, there will be too many candidates that are completely inside the query geometry. As described above, passing each candidate through the secondary filter is quite expensive. On the other hand, if the query is small and many candidates exist that contain the query, then the query can also be quite expensive.

For most spatial datasets, the data geometries typically have hundreds or thousands of vertices and are arbitrarily complex. Secondary filter computation for such geometries takes a long time as opposed to the primary filter. FIG. 2(a) illustrates this by comparing the time taken for primary and secondary filters according to an example utilizing Oracle Spatial available from Oracle Corporation. The data consists of 230K polygons representing the US census blocks. The queries correspond to an approximate geometry that represents a circle of 0.25, 0.5, 1, 2, 5, 10, 25, 50, or 100 mile radius on the surface of earth. Since arcs and circles are not easily representable on the surface of the earth the circle queries are densified to regular convex polygons in geodetic and non-geodetic domains. The center of the query is randomly-generated using locations of business centers across the United States. Such queries, where the query area is larger than those of the spatial features, are quite common in most GIS applications and spatial analysis queries. The x-axis shows the radius in miles from the query center and the y-axis plots the response time for each filter. The figure illustrates that the secondary-filter time is at least twice that of the filter time and dominates the overall computation time. This holds for all radii for the query circle.

The high cost for carrying out the secondary-filter is due to two reasons. First, the loading cost for geometries, or in other words, the cost of the table accesses that fetch candidate geometries. Second, the high cost is attributable to the comparison cost, which is the cost of comparing complex data geometries with the query geometry. For point datasets, the loading cost dominates and for polygon datasets, both costs contribute significantly.

A prior solution provides a method that can analyze the geometries and eliminate many geometries from the need to perform the costly and time-consuming mathematical comparison of the geometries. This prior solution solves the problem by including an intermediate filter that can eliminate many, if not most, candidates from needing to undergo the expensive secondary filter. This prior solution is particularly useful where the query geometry is particularly large or particularly small. Identifying geometries that lie entirely within the interior rectangle can eliminate these geometries from undergoing the costly exact mathematical comparison.

Figure 4A:
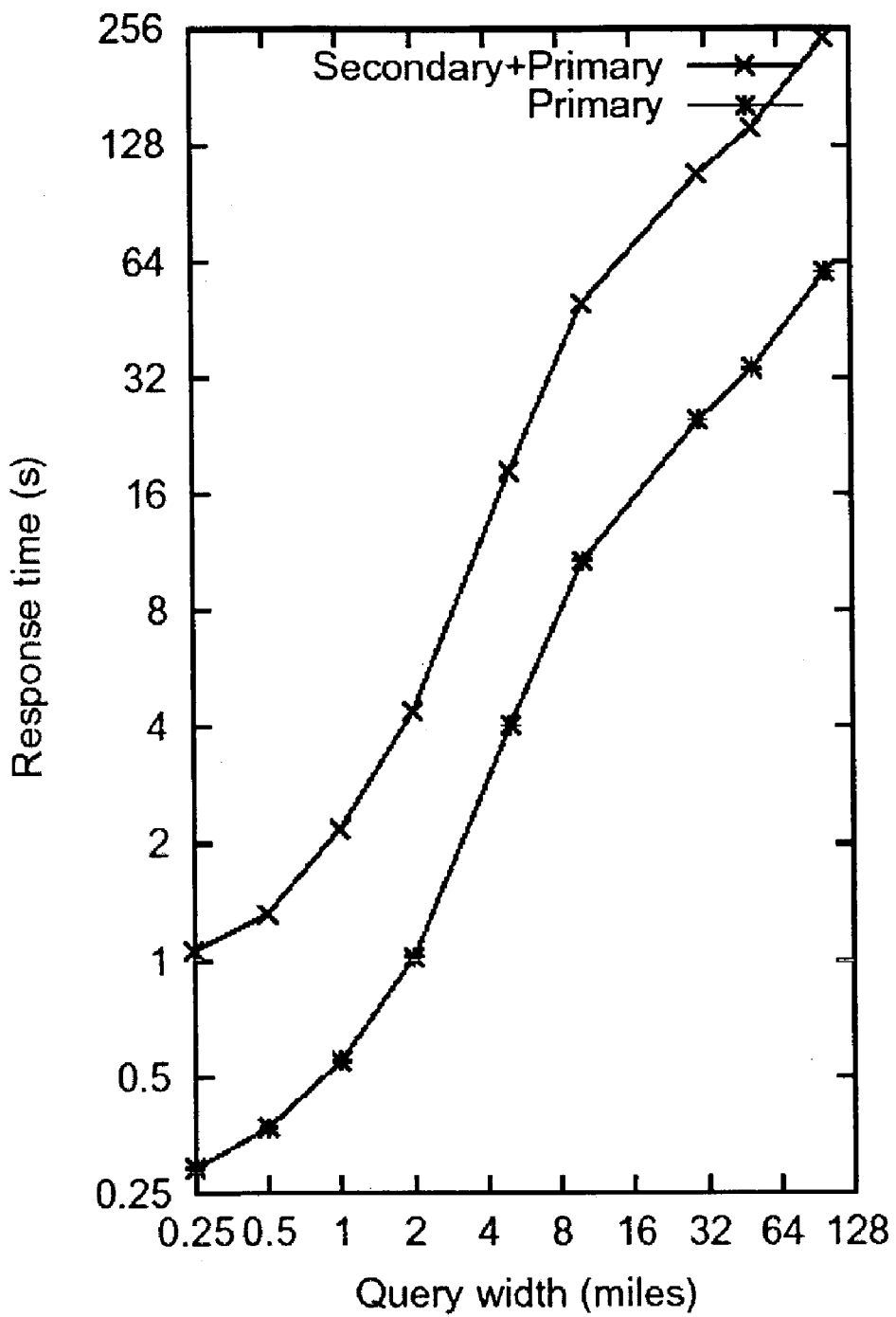
FIG. 4a represents a graph that illustrates a relationship between response time and query width for a query carried out according to a known process including a primary and a secondary filter.
Figure 4B:
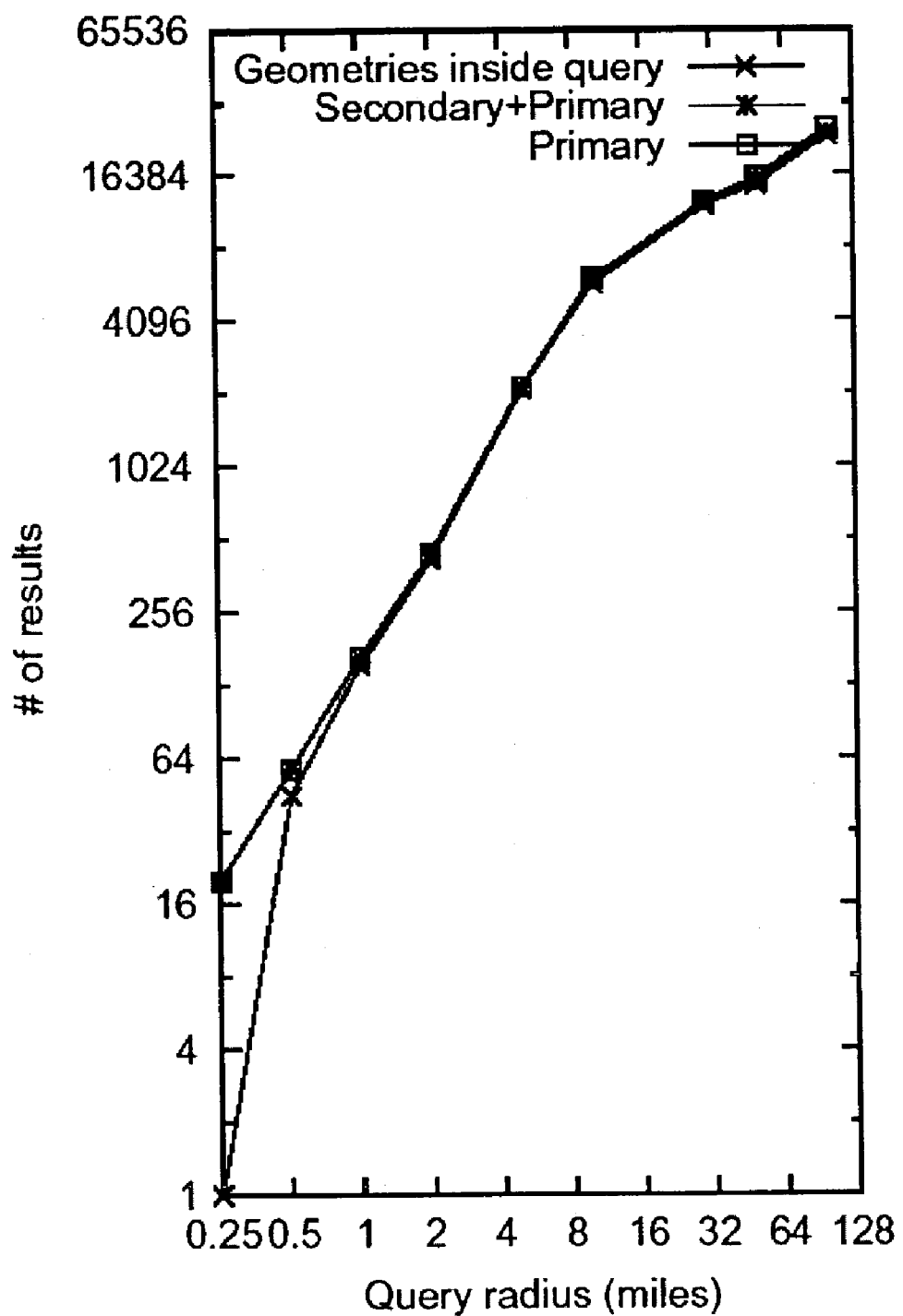
FIG. 4b represents a graph that illustrates a relationship between number of results and query radius for a query carried out according to a known process including a primary and a secondary filter.

FIG. 4(a) illustrates that the number of geometries eliminated in the secondary filter is quite small compared to the total number retrieved. FIG. 4(b) shows that in almost all the cases the difference in primary and secondary filter results is less than about 10%. Additionally, FIG. 4(b) also indicates that as the query radius increases a substantial number of the results are completely inside the query. From this, it could be inferred that whenever the query window is large compared to data sizes, checking for containment in the query may be a useful pruning strategy for bypassing the secondary filter. That is, if a data geometry is completely inside a query geometry, then it could be accepted without passing it to the expensive secondary filter.

The present invention is particularly related to the situations where the query is to retrieve the k-closest data geometries to a specified query geometry using the R-tree index. Since, as described above, data-query geometry distance computations are expensive, these should be minimized. The present invention provides a new and particularly effective way to reduce the cost and time required to solve such queries.

Known solutions/implementations for solving nearest neighbor queries may first utilize minimum bounding rectangle (MBR) approximations in the index to compute the minimum distance of the query and a data item. If this distance d is greater than the maximum distance to the "current candidate" set of k neighbors then the data geometry is pruned/filtered out from further searching. Otherwise, the "expensive" exact distance between the data and query geometries is computed. Since many such candidate sets of neighbors are evaluated, there are many "exact" distance computations that could slow down query performance.

According to one known method, instead of computing the exact query-data distance right away once the MBR-distance is less than the current cutoff distance, the candidate geometries are maintained in a distance-ordered priority queue along with the index nodes. However, since there could be many data elements the size of this priority queue could grow as big as the database and may not fit in memory.

The present invention provides solutions to known methods by managing the queue of candidate geometries separately from the queue of index nodes. The queue for index nodes is processed as in known methods. According to the invention, a minimum bounding rectangle is determined for a query geometry. A minimum bounding rectangle is also determined for each data geometry to be compared to the query geometry. Candidate geometries are first identified by determining if the data geometries fulfill a first filter condition with respect to the query geometry. This typically includes comparing the minimum bounding rectangles of the data and query geometries. The first filter condition typically includes determining a distance between the minimum bounding rectangle for the query geometry and the minimum bounding rectangles of the data geometries.

A queue of candidate geometries is created from data geometries within a certain distance. Along these lines, whenever the MBR-distance of a data MBR to query MBR is less than the cutoff distance, the candidate-geometries are maintained in a separate "data priority queue" that orders the items by MBR distance. The data priority queue has a limited size to limit memory usage. Reaching the size limit can trigger processing of the contents of the data priority queue. This processing will include evaluation of the exact distance from query for only those candidate geometries whose MBR distance to the query is less than or equal to the current "threshold distance". The size of the data priority queue, in other words, the number of candidate geometries that are included may vary. The number may vary depending upon a number of factors, such to optimize the processing in various ways. According to one example, the data priority queue has a capacity of 1000. The size typically is about 200 to about 2000.

A number of other events may also trigger processing of the queue. For example, the queue may be processed when no more R-tree nodes remain to be searched. Also, if the queue limit is reached after processing an R-tree node, the queue contents may be processed. Furthermore, according to another embodiment, if the next R-tree node to be processed is farther than the first data MBR in the data-priority queue, data items having a MBR distance that is smaller than the closest R-tree node distance may be processed. In all cases, "processing" the contents of the queue includes computing exact distances and checking the results for inclusion in the result only for those elements (data geometries) whose MBR distance is less than or equal to the current "threshold distance". At all times, the current threshold distance is updated to reflect the kth smallest of all "currently" computed exact geometry-query distances." Here k is the number of the nearest-neighbors requested by the user for the query.

Within the data priority-queue, the candidate geometries may be ordered in increasing order of the distance of their MBRs to the query. As a result, when pruning using the threshold distance, only first few elements of the data priority queue may be processed. Once an element (data geometry) with query-to-MBR distance>threshold distance is found, all elements of the data priority queue may be discarded (without processing) as the query-to-geometry distance>query-to-MBR distance>threshold distance, which implies those elements cannot be closer than the current set of nearest neighbors. By not processing such elements, that is, by not computing the exact distances, the nearest neighbor avoids expensive distance computations whenever possible and works faster. Alternatively, for the data priority queue, any other order in addition to the increasing order of MBR(-to-query) distance may be utilized if it is found efficient.

As described above, the geometries may be included in a database organized with an R-tree index. In such embodiments, the distance from each R-tree node processed to the query geometry. The distance between the R-tree node and the query geometry is compared to the distance between the query geometry and a candidate geometry closest to the query geometry. The distance between the query geometry and candidate geometries closer than an R-tree node closest to the query geometry is mathematically calculated.

The present invention also includes a computer program product for performing the process of determining relationships among objects represented in a database according to the present invention. The computer program product includes a computer readable medium and computer program instructions, recorded on the computer readable medium, executable by a processor. The steps include those described above in detail.

Furthermore, the present invention includes a system for performing a process of determining relationships among objects represented in a database. The system includes a processor operable to execute computer program instructions. Additionally, the system includes a memory operable to store computer program instructions executable by the processor. The steps include those described above in detail.

The present invention can address slow performance of nearest-neighbor queries, especially where non-spatial predicates are used in conjunction with a nearest-neighbor predicate. The number of distance computations was determined to be a bottleneck. The delayed exact-distance approach according to the present invention reduces drastically the number of data-query geometry distance computations in a nearest-neighbor query. It also limits the amount of memory usage unlike existing research solutions. Therefore, the present invention is a database solution that scales with the size of the dataset.

In one experiment using customer data and queries searching for nearest banks of a "certain category", the above limited-memory optimization for delayed (exact-) distance computation has reduced the exact distance computation by a factor of about five, also improving the query time by a factor of about five. This demonstrates the efficacy of the technique of the present invention in a commercial database system where only limited memory can be assumed.

Figure 5:
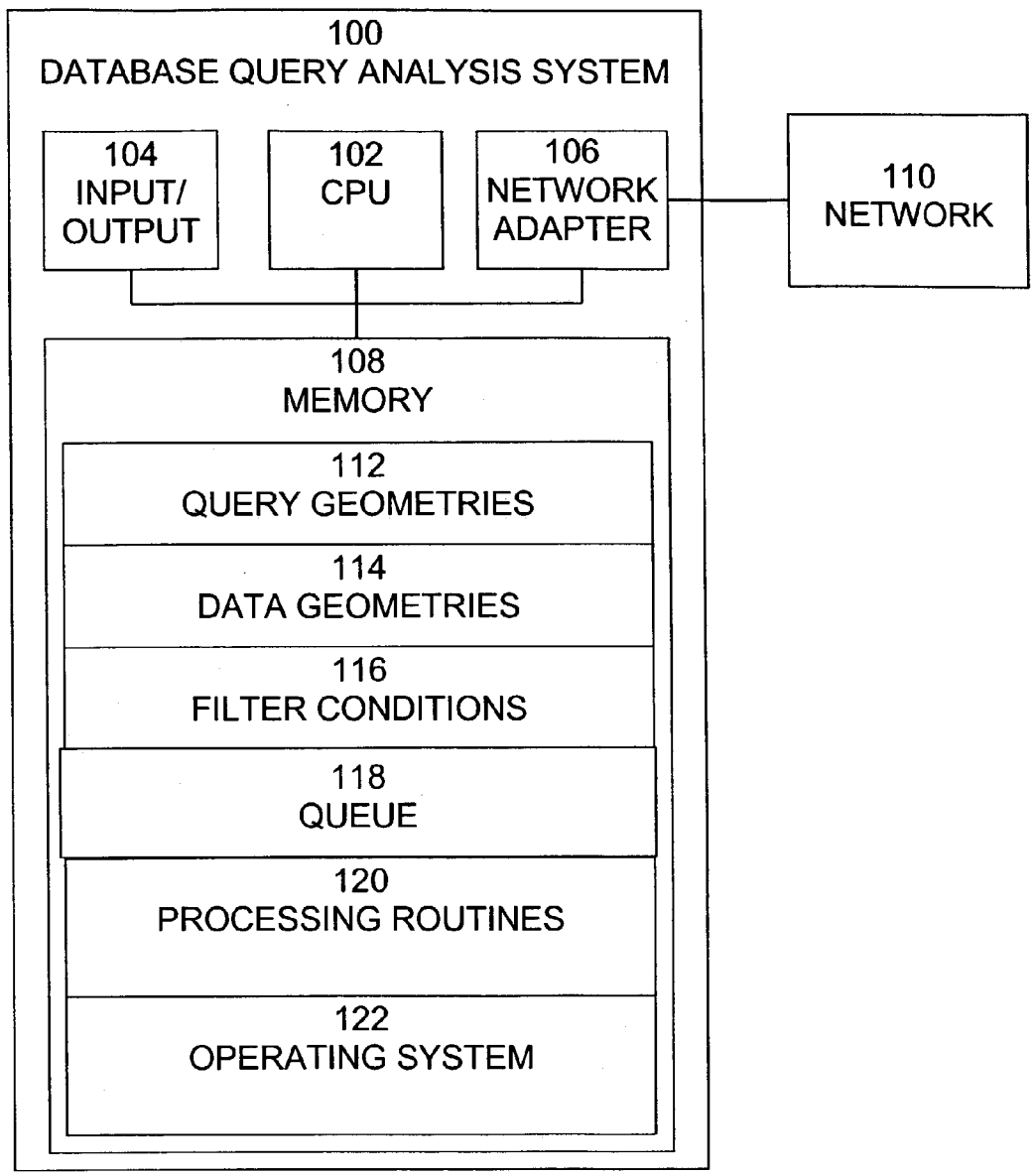
FIG. 5 represents an exemplary block diagram of a system according to the present invention for performing a process of determining relationships among objects represented in a database.

An exemplary block diagram of a system 100, according to the present invention, is shown in FIG. 5. The system 100 is typically a programmed general-purpose computer system, such as a personal computer, workstation, server system, and minicomputer or mainframe computer. System 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces transaction processing system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as query geometry block 112, data geometries block 114, filter condition block 116, queue block 118 and a plurality of blocks of program instructions, such as processing routines 120 and operating system 122. Query geometry block 112 stores query geometries and their minimum bounding rectangles that have been received by transaction processing system 100. Data geometries block 114 stores a plurality of data geometries and their minimum bounding rectangles that have been received by the system. The filter condition block includes potential filter conditions that may be utilized to identify potential candidate geometries and queue block includes candidate geometries that fulfill one or more filter conditions. Processing routines 120 are software routines that implement the processing performed by the present invention. Operating system 122 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

I claim:

1. In a database system, a computer-implemented method for locating neighboring geometric elements and geographic objects, represented as data geometries stored in the database system, of a query geometry, the method comprising:

storing in the database data geometries representing geometric elements, geographic objects, or both;

determining a minimum bounding rectangle of the query geometry;

determining a minimum bounding rectangle of each data geometry;

identifying as candidate data geometries those data geometries for which a distance between the minimum bounding rectangle of the query geometry and the minimum bounding rectangle of the data geometry is less than a threshold distance; and determining a distance between the query geometry and only each candidate data geometry when a number of candidate data geometries equals a threshold number.

2. The method according to claim 1, further comprising: continuously updating the threshold distance to a value equal to one of the distances between the query geometry and a candidate data geometry.

3. The method according to claim 2, wherein the threshold distance is updated to a smallest distance between the query geometry and a candidate data geometry.

4. The method according to claim 1, further comprising: ordering the candidate data geometries by distance from the query geometry.

5. The method according to claim 1, wherein the data geometries are included in a database organized with an R-tree index, wherein the data geometries are mathematically compared with the query geometry when all nodes in the R-tree index have been searched.

6. The method according to claim 1, wherein the threshold number of geometries is 1000.

7. The method according to claim 1, wherein the data geometries are included in a database organized with an R-tree index, the method further comprising:

determining a distance from each R-tree node processed to the query geometry; comparing the distance from the R-tree node to a distance between the candidate geometry closest to the query geometry; and mathematically calculating a distance between the query geometry and candidate data geometries closer than an R-tree node closest to the query geometry.

8. In a database system, a computer-implemented method for comparing geometric elements and geographic objects, represented as data geometries stored in the database system, with a query geometry, the method comprising:

storing in the database data geometries representing geometric elements, geographic objects, or both;

determining a minimum bounding rectangle of the query geometry;

determining a minimum bounding rectangle of each data geometry;

identifying candidate data geometries by determining whether data geometries fulfill a first filter condition with respect to the query geometry by comparing the minimum bounding rectangles of each data geometry with the minimum bounding rectangle of the query geometry;

continuing the comparing of the minimum bounding rectangle of the query geometry with the minimum bounding rectangles until a number of data geometries that fulfill the first filter condition reaches a threshold value; and comparing the query geometry with each data geometry that fulfills the first filter condition, upon the number of data geometries that fulfill the first filter condition reaching the threshold value.

9. The method according to claim 8, further comprising: ordering the candidate data geometries by increasing distance from the query geometry.

10. The method according to claim 8, wherein the first filter condition comprises a threshold distance based on a predetermined number of distances between the query geometry and data geometries.

11. The method according to claim 10, wherein a data geometry satisfies the first filter condition if the distance between the minimum bounding rectangle and the query geometry is less than or equal to the threshold distance.

12. The method according to claim 11, wherein the data geometries are included in a database organized with an R-tree index, the method further comprising:

determining a distance from each R-tree node processed to the query geometry; comparing the distance of the query geometry from the R-tree node to the threshold distance; and mathematically calculating a distance between the query geometry and candidate data, geometries closer than an R-tree node closest to the query geometry.

13. The method according to claim 10, further comprising:

mathematically calculating a distance between the query geometry and the candidate data geometries when a number of candidate data geometries equals a threshold number or when no more data geometries remain.

14. The method according to claim 13, wherein the distance between the query geometry and the candidate geometry is computed only for geometries having a distance between the minimum bounding rectangle of the candidate geometry and the minimum bounding rectangle of the query geometry less than or equal to the threshold distance.

15. The method according to claim 8, further comprising:

mathematically calculating a distance between the query geometry and the candidate data geometries when a number of candidate data geometries equals a threshold number or when no more data geometries remain.

16. The method according to claim 15, wherein the data geometries are included in a database organized with an R-tree index.

17. The method according to claim 8, wherein the threshold value of data geometries is 1000.

18. A computer program product for performing a process of determining relationships among geometric elements and geographic objects represented in a database, comprising:

a computer readable medium; and computer program instructions, recorded on the computer readable medium, executable by a processor, for performing the steps of storing in the database data geometries representing geometric elements, geographic objects, or both;

determining a minimum bounding rectangle of the query geometry;

determining a minimum bounding rectangle of each data geometry;

identifying candidate data geometries by determining whether data geometries fulfill a first filter condition with respect to the query geometry by comparing the minimum bounding rectangles of each data geometry with the minimum bounding rectangle of the query geometry;

continuing the comparing of the minimum bounding rectangles until a number of data geometries that fulfill the first filter condition reaches a threshold value; and comparing the query geometry with each data geometry that fulfills the first filter condition, upon the number of data geometries that fulfill the first filter condition reaching the threshold value.

19. A system for performing a process of determining relationships among geometric elements and geographic objects represented in a database, comprising:
- a processor operable to execute computer program instructions; and
- a memory operable to store computer program instructions executable by the processor, for performing the steps of:
- storing in the database data geometries representing geometric elements, geographic objects, or both;
- determining a minimum bounding rectangle of the query geometry;
- determining a minimum bounding rectangle of each data geometry;
- identifying candidate data geometries by determining whether data geometries fulfill a first filter condition with respect to the query geometry by comparing the minimum bounding rectangles of each data geometry with the minimum bounding rectangle of the query geometry;
- continuing the comparing of the minimum bounding rectangles until a number of data geometries that fulfill the first filter condition reaches a threshold value; and
- comparing the query geometry with each data geometry that fulfills the first filter condition, upon the number of data geometries that fulfill the first filter condition reaching the threshold value.

* * * * *